United States Patent
Yang et al.

[11] Patent Number: 5,916,134
[45] Date of Patent: Jun. 29, 1999

[54] CATALYTIC CONVERTER PROVIDED WITH VORTEX GENERATOR

[75] Inventors: Jyh-Chyang Yang, Hsinchu; Shyh-Shyan Lin, Taipei, both of Taiwan

[73] Assignee: Industrial Technology Research Institute, Hsinchu, Taiwan

[21] Appl. No.: 08/926,444

[22] Filed: Sep. 10, 1997

[51] Int. Cl.[6] ........................................ F01N 3/28
[52] U.S. Cl. .............................. 60/299; 138/39; 422/176
[58] Field of Search .............................. 60/299; 138/39, 138/40, 42; 422/176, 220

[56] References Cited

U.S. PATENT DOCUMENTS

| | | | |
|---|---|---|---|
| 1,974,110 | 9/1934 | Higley | 138/39 |
| 2,216,846 | 10/1940 | Lewis | 138/40 X |
| 3,930,485 | 1/1976 | Konomi | 123/590 |
| 3,964,875 | 6/1976 | Chang et al. | 138/40 X |
| 4,466,741 | 8/1984 | Kojima | 138/39 X |
| 5,103,641 | 4/1992 | Maus et al. | 60/299 |
| 5,185,998 | 2/1993 | Brew | 60/299 |

*Primary Examiner*—Tony M. Argenbright
*Attorney, Agent, or Firm*—Browdy and Neimark

[57] ABSTRACT

A catalytic converter consists of an exhaust gas inlet, an exhaust gas outlet, and a catalytic reactor located between the inlet and the outlet for reacting with the exhaust gas discharged by the internal combustion engine of a motor vehicle, so as to reduce air pollution. The exhaust gas inlet is provided with a vortex generator for causing the incoming exhaust gas to flow in a helical path into the inlet and than the catalytic reactor in which the exhaust gas reacts uniformly and thoroughly with all cross-sectional areas of the catalytic reactor of the catalytic converter.

10 Claims, 3 Drawing Sheets

CATALYTIC CONVERTER PROVIDED WITH VORTEX GENERATOR

FIELD OF THE INVENTION

The present invention relates generally to a catalytic converter connected to the exhaust system of the internal combustion engine of an automotive vehicle, particularly to a device designed to guide the exhaust gas such that the catalytic converter can react more efficiently with the exhaust gas so as to reduce air pollution.

BACKGROUND OF THE INVENTION

The Taiwan Patent Publication Nos. 140531, 160174, 173030, and 192038 disclose a catalytic converter, which is shown in FIG. 1 and is composed of an inlet 11, an expansion chamber 12, an outlet 13, and a reactor 14 covered with catalyst. In order to avert any adverse impact that the reactor 14 might have on the performance of the internal combustion engine, the catalytic converter is provided with the expansion chamber 12 for reducing the exhaust back pressure of the engine in operation. In the process, the exhaust fume is allowed to enter the expansion chamber 12 via the inlet 11 such that the flow of the exhaust gas passing the central area of the reactor 14 is greater than the flow of the exhaust gas passing the peripheral area of the reactor 14. As a result, the catalyst located in the central area of the reactor 14 is subjected to a more intensive chemical reaction with the exhaust fume, thereby resulting in an acceleration in the breakdown of the central area catalyst. On the other hand, the catalyst located in the peripheral area of the reactor 14 is relatively intact. It is therefore readily apparent that the prior art catalytic converter described above is inefficient at best, and that an improvement is called for.

SUMMARY OF THE INVENTION

It is therefore the primary objective of the present invention to provide a catalytic converter with an exhaust flow guiding device for expanding the reaction area of the reactor of the catalytic converter such that the reaction between the exhaust gas and the catalytic converter takes place efficiently.

It is another objective of the present invention to provide an improved catalytic converter in which the chemical filtration of the exhaust gas takes place uniformly throughout the cross sectional area of the catalytic converter, so as to prolong the service life span of the catalytic converter.

It is still another objective of the present invention to provide a catalytic converter with an exhaust flow guiding device which is simple in construction, cost-effective, and effective in reducing the air pollutant without undermining the performance of the engine of an automotive vehicle.

In keeping with the principle of the present invention, the foregoing objectives of the present invention are attained by the exhaust flow guiding device consisting of a vortex generator which is located in the catalytic converter to generate an axial vortex flow pattern for the exhaust gas, so as to bring about an increase in the reaction area between the exhaust fume and the catalyst. The efficiency of the catalytic converter connected to the exhaust system of an automotive vehicle is therefore greatly improved by the exhaust flow guiding device of the present invention.

The foregoing objectives, features, functions and advantages of the present invention will be more readily understood upon a thoughtful deliberation of the following detailed description of the embodiments of the present invention with reference to the accompanying drawings.

DETAILED DESCRIPTION OF THE INVENTION

Figure 1:
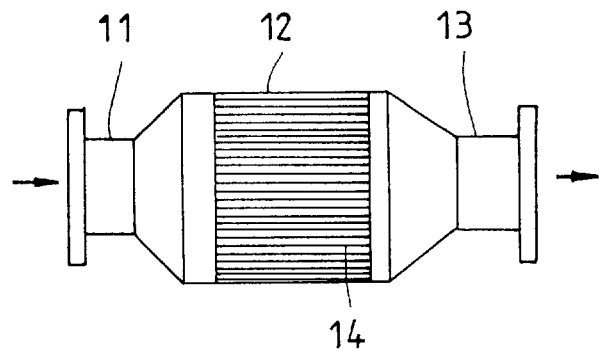
FIG. 1 shows a longitudinal sectional view of a catalytic converter of the prior art.
Figure 2:
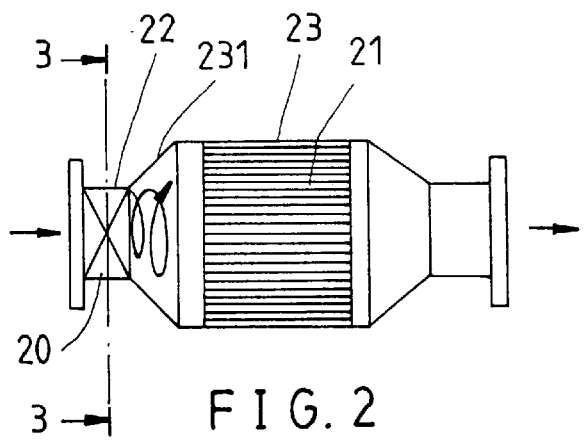
FIG. 2 shows a longitudinal sectional view of a first preferred embodiment of the present invention together with a catalytic converter.
Figure 3:
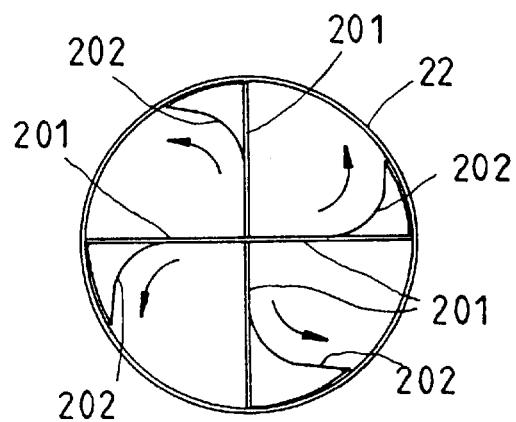
FIG. 3 shows a sectional view of a portion taken along the direction indicated by a line 3—3 as shown in FIG. 2.
Figure 4:
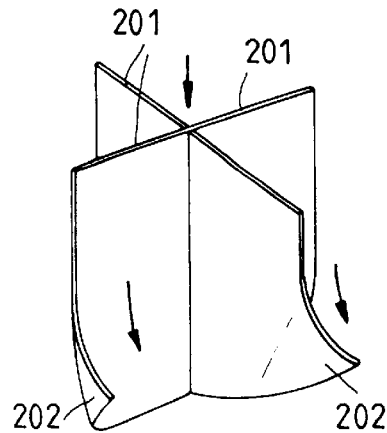
FIG. 4 shows a perspective view of the first preferred embodiment of the present invention.

As shown in FIGS. 2–3, an exhaust flow guiding device embodied in the present invention is composed of an axial vortex generator 20, which is connected to an inlet 22 of a catalytic reactor 21 and is made up of four blades 201 arranged at an interval of 90 degrees such that the cross section of the vortex generator 20 shows a cruciform arrangement of the four blades 201, as illustrated in FIG. 3. The four blades 201 are provided respectively in the same direction of chord in the outer side of a tail end thereof with an arcuate surface 202 of a predetermined radian, as shown in FIGS. 3 and 4. When the exhaust flow travels through the vortex generator 20 in the directions indicated by the arrows, the exhaust flow is guided by the arcuate surfaces 202 to enter the inlet 22 in a helical path so as to form an axial three-dimensional vortex in the expansion chamber 23 of the catalytic converter. As a result, the exhaust gas is capable of diffusing throughout the cross-sectional area of the reactor 21 such that the chemical filtration of the exhaust gas is brought about uniformly throughout the reactor 21. The catalytic converter, which is provided with the vortex generator 20 of the present invention, is therefore cost-effective and capable of reducing air pollution efficiently.

Figure 5:
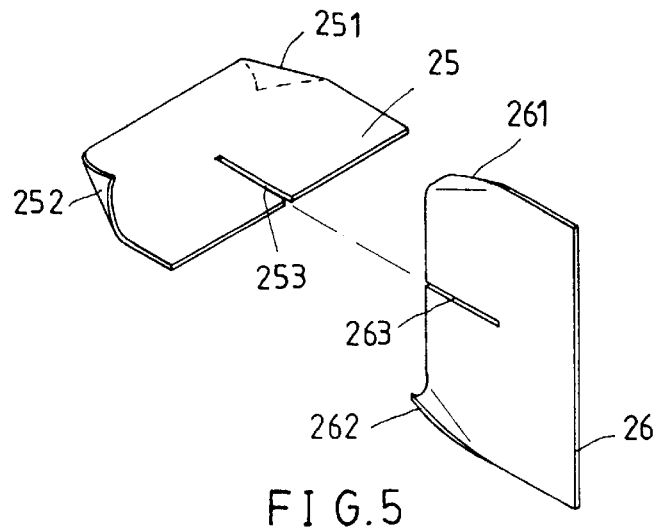
FIG. 5 shows an exploded view of vortex generator of the first preferred embodiment of the present invention.

The four blades 201 of the vortex generator 20 of the present invention may be made separately and then fused together by welding. An alternative method for making the vortex generator 20 involves the use of two rectangular plates 25 and 26, shown in FIG. 5. The tail ends of both sides of the plates 25 and 26 are curved respectively in opposite directions to form four arcuate surfaces 251, 252, 261, and 262, whereas the plates 25 and 26 are provided respectively in the center thereof with a groove 253 or 263 for coupling the plates 25 and 26 to form the vortex generator 20, which is then disposed in the inlet 22 of the catalytic converter by welding.

As is best shown in FIG. 4, each blade 201 may include a substantially flat portion and the arcuate surface 202 comprises a curled corner of an outer downstream corner of the flat portion of the blade 201.

Figure 6:
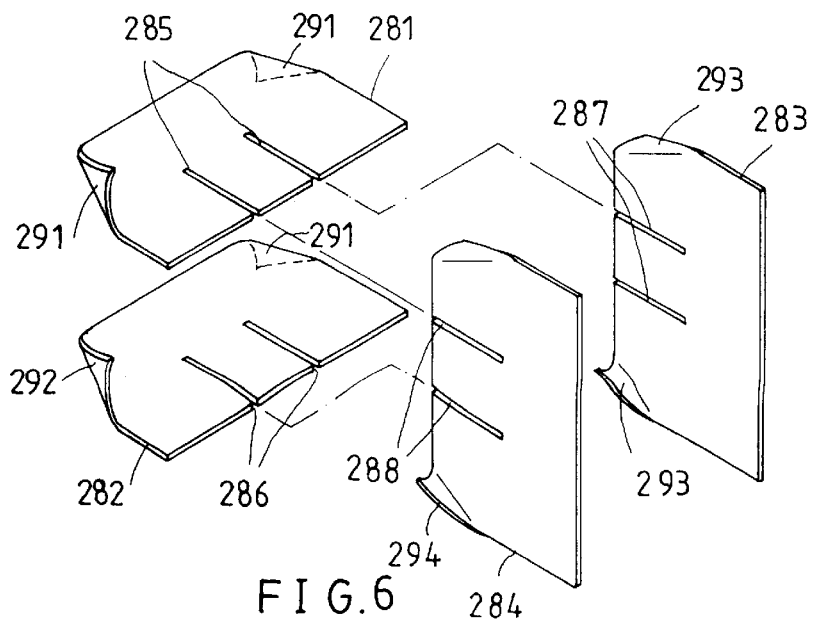
FIG. 6 shows an exploded view of another vortex generator of the first preferred embodiment of the present invention.

It must be noted here that the vortex generator 20 of the present invention may be made of four rectangular plates 281, 282, 283, and 284, which are provided respectively with two grooves 285, 286, 287, 288, as shown in FIG. 6.

The vortex generator 20 is therefore provided with 8 arcuate surfaces 291, 292, 293 and 294.

Figure 7:
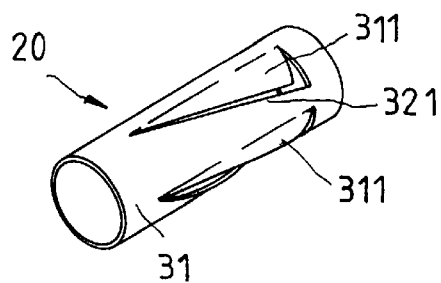
FIG. 7 shows a perspective view of a second preferred embodiment of the present invention.
Figure 8:
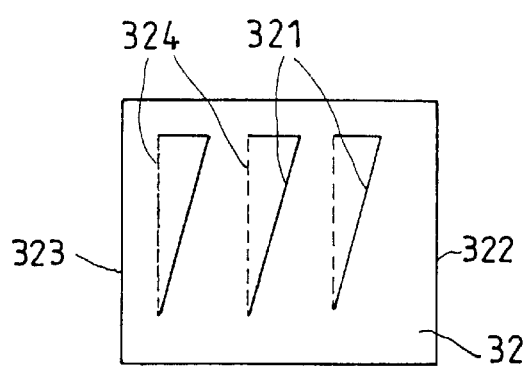
FIG. 8 is a schematic plan view of the vortex generator of the second preferred embodiment of the present invention.

As shown in FIG. 7, a vortex generator 20 of the second preferred embodiment is formed of a cylindrical tube 31 which is provided in the tube wall thereof with a plurality of arcuate surfaces 311 separated from one another at an interval. The cylindrical tube 31 can be forced into the inlet of a catalytic converter for guiding the exhaust flow to travel in a helical path so as to enhance the reaction of the catalytic converter with the exhaust gas. In the process of making the vortex generator 20 of the second preferred embodiment of the present invention, a rectangular plate 32 is provided in the surface thereof with a plurality of severance lines 321 by punching and pressing, as illustrated in FIG. 8. The plate 32 is then rolled to form a tubular member by welding both side ends 322 and 323. A plurality of arcuate surfaces 311 are formed by curving inwards the portions defined by the severance lines 321 and the imaginary lines 324. An alternative process involves the formation of the severance lines 321, as shown in FIG. 8, on the surface of a tubular material. The severed areas are then curved inwards to form a plurality of arcuate surfaces 311.

Figure 9:
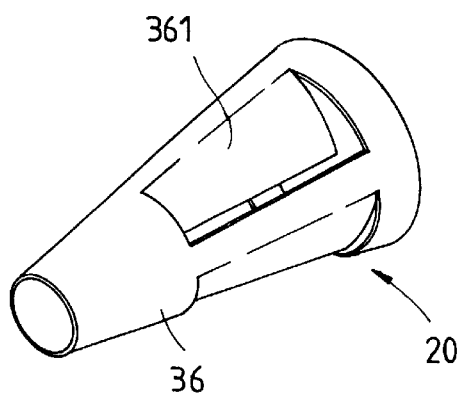
FIG. 9 shows a perspective view of a third preferred embodiment of the present invention.
Figure 11:
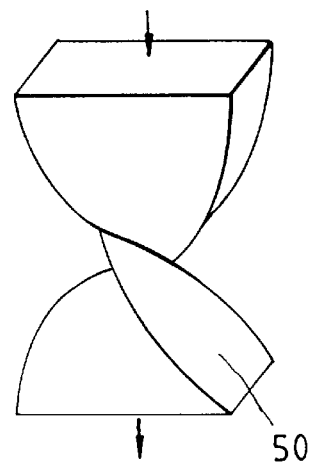
FIG. 11 shows a schematic view of a vortex generator of a fifth preferred embodiment of the present invention.
Figure 10:
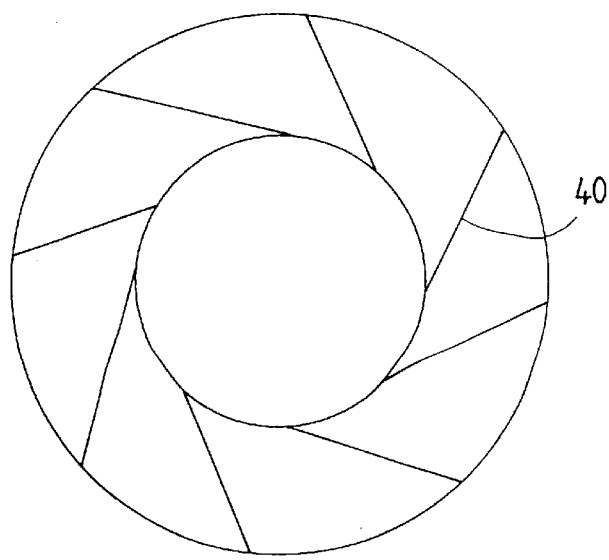
FIG. 10 shows a radial schematic view of a vortex generator of a fourth preferred embodiment of the present invention.

As shown in FIG. 9, a vortex generator 20 of the third preferred embodiment of the present invention is made of a conical member 36 such that the conical vortex generator 20 is engageable with the conical expansion section 231 of the expansion chamber 23, as shown in FIG. 2. In addition, the conical vortex generator (the conical member 36) is provided in the wall thereof with a plurality of arcuate surfaces 361 bending inwards. The conical vortex generator (the conical member 36) is engaged with the expansion section 231 of the expansion chamber 23 of the catalytic converter for guiding the exhaust gas to travel through the expansion chamber 23 in a helical path, thereby resulting in a thorough contact of the exhaust gas with the catalytic reactor so as to reduce air pollution. The method for making the conical vortex generator is similar to that for making the cylindrical vortex generator. In addition, the vortex generator of the present invention may take the form of a vortex blade 40 shown in FIG. 10, or a hemp flower 50 shown in FIG. 11. Moreover, the vortex generator of the present invention is made of a thin plate or tube such that the ratio of the cross sectional area of the vortex generator and the cross sectional area of the inlet of the catalytic converter is rather small, and that the obstruction effect of the vortex generator of the present invention does not give rise to a substantial reduction in the exhaust pressure to undermine the performance of the engine. The plate referred to above may be rectangular or sectoral in shape.

The embodiments of the present invention described above are to be regarded in all respects as being merely illustrative and not restrictive. Accordingly, the present invention may be embodied in other specific forms without deviating from the spirit. The present invention is therefore to be limited only by the scopes of the following appended claims.

What is claimed is:

1. A catalytic converter connectable to an exhaust system of an automotive vehicle to react with exhaust gas from an internal combustion engine of the automotive vehicle, said catalytic converter comprising an exhaust gas inlet, an exhaust gas outlet, and a reactor located between the exhaust gas inlet and the exhaust gas outlet;

wherein the exhaust gas inlet includes a vortex generator fastened therewith and composed of a plurality of blades each having an arcuate surface;

and wherein each of the blades includes a substantially flat portion and the arcuate surface comprises a curled corner of an outer downstream corner of the flat portion;

whereby the exhaust gas reacts uniformly and thoroughly with all cross-sectional areas of the reactor of the catalytic converter.

2. The catalytic converter as defined in claim 1, wherein said blades of said vortex generator are made separately and fused together by welding.

3. A catalytic converter connectable to an exhaust system of an automotive vehicle to react with exhaust gas from an internal combustion engine of the automotive vehicle, said catalytic converter comprising an exhaust gas inlet, an exhaust gas outlet, and a reactor located between the exhaust gas inlet and the exhaust gas outlet:

wherein the exhaust gas inlet includes a vortex generator fastened therewith and composed of a plurality of blades each having an arcuate surface capable of causing the exhaust gas to flow in a generally helical path into the inlet and then the reactor of the catalytic converter, so as to enable the exhaust gas to react uniformly and thoroughly with all cross-sectional areas of the reactor of the catalytic converter;

wherein said vortex generator is composed of four blades which are fused together at a common center such that two adjoining blades form therebetween an angle of 90 degrees.

4. A catalytic converter connectable to an exhaust system of an automotive vehicle to react with exhaust gas from an internal combustion engine of the automotive vehicle, said catalytic converter comprising an exhaust gas inlet, an exhaust gas outlet, and a reactor located between the exhaust gas inlet and the exhaust gas outlet;

wherein the exhaust gas inlet includes a vortex generator fastened therewith and composed of a plurality of blades each having an arcuate surface capable of causing the exhaust gas to flow in a generally helical path into the inlet and then the reactor of the catalytic converter, so as to enable the exhaust gas to react uniformly and thoroughly with all cross-sectional areas of the reactor of the catalytic converter;

wherein said blades of said vortex generator are provided respectively with a groove intended for use in joining said blades together.

5. A catalytic converter connected to the exhaust system of an automotive vehicle and designed to react with the exhaust gas discharged by an internal combustion engine of the automotive vehicle, said catalytic converter consisting of an exhaust gas inlet, an exhaust gas outlet, and a reactor located between the exhaust gas inlet and the exhaust gas outlet;

wherein the exhaust gas inlet is provided with a vortex generator fastened therewith and made of a tubular member provided in a wall thereof with a plurality of severance areas each bending to form an arcuate surface capable of causing the exhaust gas to flow in a helical path into the inlet and then the reactor of said catalytic converter, so as to enable the exhaust gas to react uniformly and thoroughly with all cross-sectional areas of the reactor of said catalytic converter.

6. The catalytic converter as defined in claim 5, wherein said vortex generator is made of a tubular member of a columnar construction.

7. The catalytic converter as defined in claim 5, wherein said vortex generator is made of a tubular member of a conical construction.

8. The catalytic converter as defined in claim 5, wherein said vortex generator is made of a plate by rolling, said plate provided with a plurality of severance lines by punching.

9. The catalytic converter as defined in claim 8, wherein said plate has a rectangular shape.

10. The catalytic converter as defined in claim 8, wherein said plate is sectoral in shape.

* * * * *